Nov. 22, 1955   G. M. BARZILAI   2,724,187
ANGLE PELVIMETER
Filed March 30, 1951   3 Sheets-Sheet 3
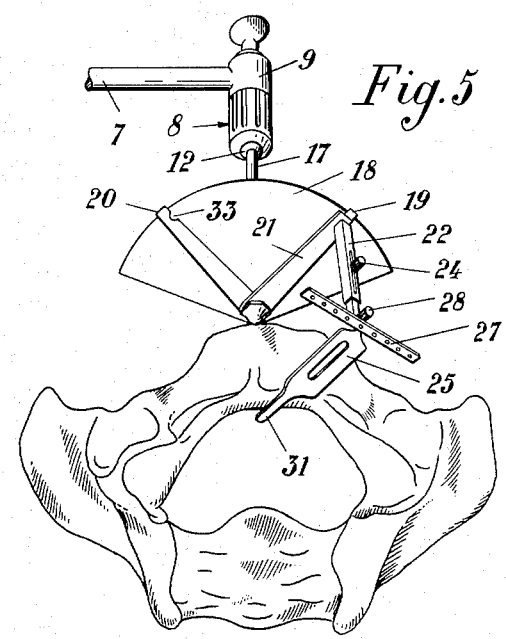
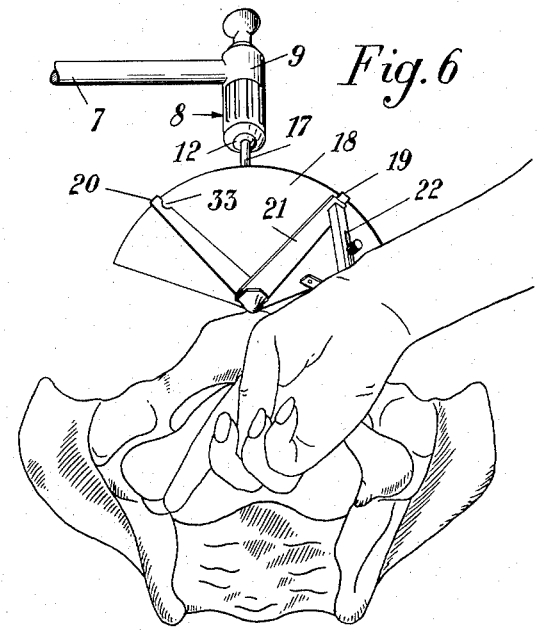
INVENTOR.
GEMMA MARIA BARZILAI
BY
Hendaroth, Lind & Panack
Attorneys

# United States Patent Office 2,724,187
Patented Nov. 22, 1955

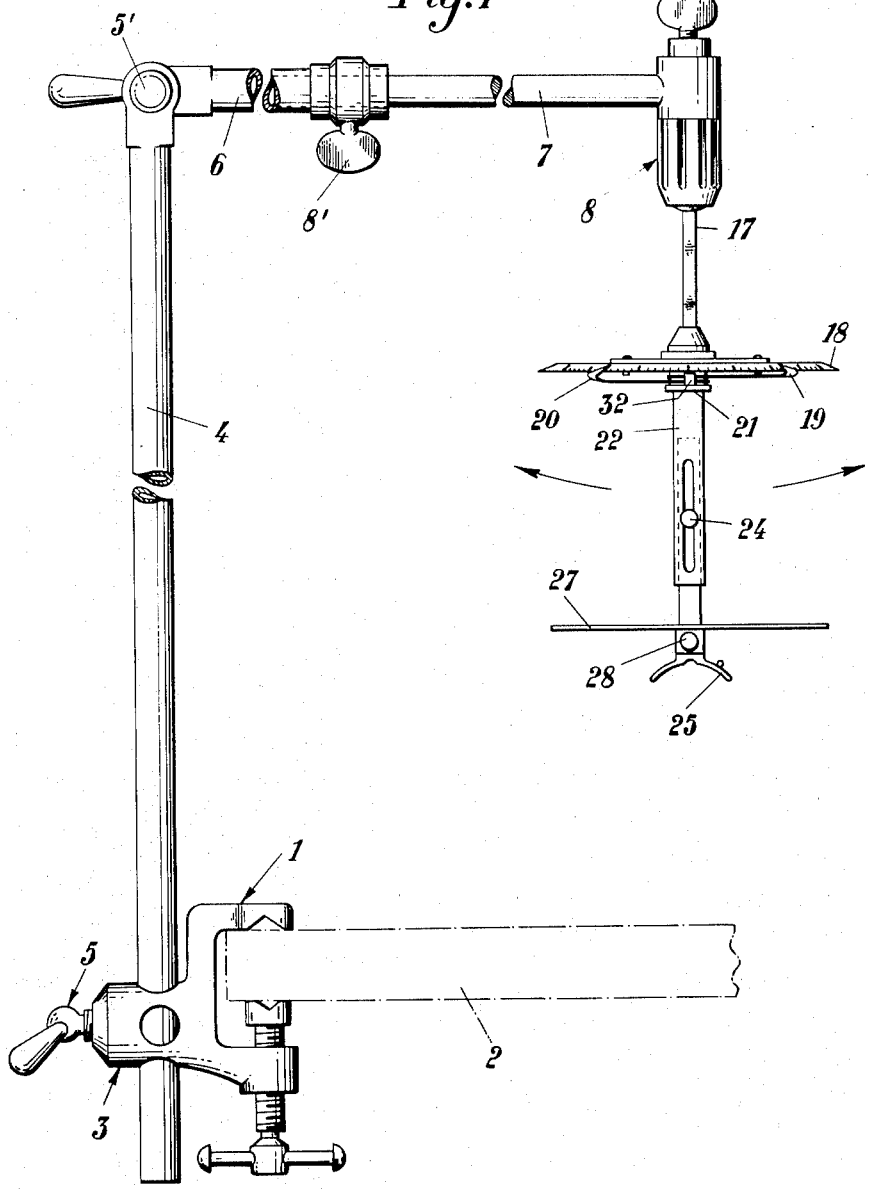

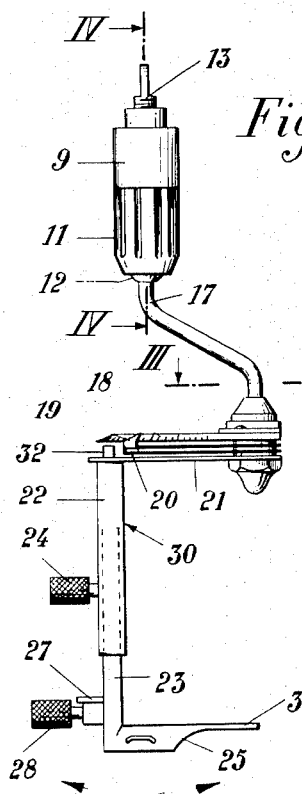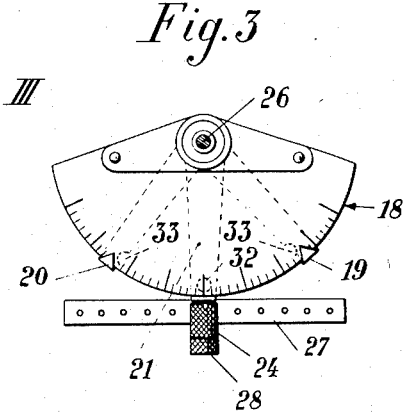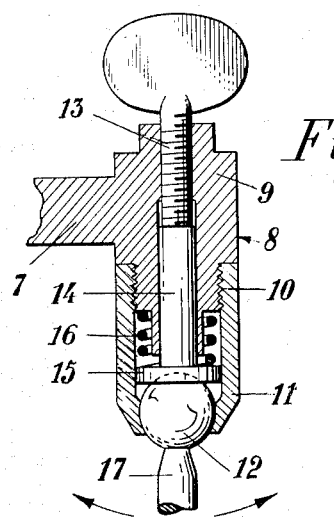

2,724,187

ANGLE PELVIMETER

Gemma Maria Barzilai, Rome, Italy

Application March 30, 1951, Serial No. 218,365

5 Claims. (Cl. 33—174)

The object of the present invention is to provide an intrument which measures the angles between internal body structures within the interior of a cavity of the human body. The instrument construction and the measurements obtained by the instrument of the inventor is based upon the geometric principle that the angles at opposite sides of a vertex are equal to each other. Although, the angles obtained on opposite sides of the vertex in the instrument of the invention are not in the same plane, these angles are located in two planes which are parallel to each other, and although the vertexes of the two angles do not coincide, they are located on the same axis which is an axis perpendicular to said planes.

The cavity where the angle is located, may be the basin bound by the hipbones through which the head of the baby must pass during delivery.

The angle itself is the retropubic angle between the lower center of the subpubic ligament and the tip of the ischiatic spines on either side.

The instrument provides the necessary measurement in a simple, rapid and economical manner to determine the capacity of the lower straights of the basin for the passage of the baby at birth.

In using the instrument the following measurements may be taken:

1. The amplitude of the spino-retropubic angle between the lower center of the triangular cartilage and the ischiatic spines on either side.

2. The distance between the center of the triangular cartilage and the tips of the spines taken as cord.

3. The subsacral distance.

The two latter measurements may be taken easily by manual means. The first one, however, is a more serious problem. It is readily solved by the instrument which is described hereinbelow.

The instrument is termed angle pelvimeter. The measurement is termed as the angle pelvimetric method of measurement and has been originated by the inventor herein.

Knowing the angle, the cord and the pubosacral distance, the space availability for the progressive plane of the foetal head at midplane can be calculated from the principles of plane trigonometry.

The same can be done for determining space availability of the inferior strait. In this case the landmarks are the center of the subpubic arc and innermost and lowest portion of the ischiatic tuberosity on either side.

No mathematical skill is needed since all the calculations are worked out beforehand and tabulated on charts or graphs.

The angle pelvimeter according to the invention comprises a dial, graduated and supported by means of a ball socket by a system of arms which rests upon a supporting means for the patient.

The pelvimeter's dial is fastened through said ball socket to an arm support and leans against the patient's symphisis, so that while measuring the center of the dial will be just above and contacting the top of the symphisis.

The dial is graduated in degrees and is movable in all planes about its pivot so that it may be brought parallel to the index finger of the palpating hand and to the plane of inclination of the midpelvic or inferior strait.

A telescope glider is fastened on the arm of the goniometer at its lower side and is completed by a beak shaped director for the hand of the physician taking the measurement.

Both are in contact with the lower center of the triangular cartilage and correspond to the center of the goniometer.

Any angular movement of the hand will be transmitted to the director and therefrom to the center of the goniometer, wherein are pivoted two gliding indexes, which mark the angle reached by the physician's hand during the measurement.

The director prevents the bending of the physician's hand and finger during measurement.

The angle pelvimeter is also useful for the measurements of the straits of the birth canal, when it is to be carried out by X-ray.

The pelvimeter is adjusted for the necessary measurement and the X-ray plate is disposed in a plane which is parallel to the dial of the pelvimeter and also, thereby, parallel to the midplane of the pelvis. In this manner of measurement and adjustment of the X-ray plate, the correct position of the X-ray plate has been insured in order that a coplanar picture is taken.

By using the angle pelvimeter as positioning device for X-ray pelvimetry, the X-ray may be taken with the patient in an obstetrical position right on the table where the manual measurement has been given. The X-ray can be taken from above and from below, the latter exposition showing the cephalopelvic relation exactly as they are sensed by the palpating hand of the obstetrician which is a distinct advantage for obstetrical as well as teaching purposes. The picture from above, besides furnishing a view from the midpelvis which is definitely parallel to the plate, also furnishes a workable view from the inlet.

A metal scale marked out in centimeters by means of holes located on a straight line is applied adjacent the pointer in such a manner that it may be disposed parallel to the dial of the pelvimeter. In taking the X-ray picture, said graduated scale also is X-rayed on the plate and it is thus possible to make the correct reading directly on the plate in spite of the distortion in the picture.

The whole procedure takes but a few moments, can be taken at the office by any expert obstetrician with the portable X-ray machine without changing the posture of the patient, and thereby serves obstetrical purposes directly and swiftly.

A preferred form of embodiment of this invention is shown in the accompanying drawings, wherein:

Fig. 1 shows a front elevation of the apparatus;

Fig. 2 shows a side elevation of the supporting joint with the dial and the director below it;

Fig. 3 shows a plane view of the dial;

Fig. 4 shows a detail cross-section taken along line IV—IV of Fig. 2;

Figs. 5 and 6 show the application of the apparatus on a dry pelvis, illustrating the position of the apparatus and of the method of manual exploration.

With reference to the drawing, the apparatus comprises a plurality of supports, comprising a jaw vise 1 which may be applied to the support of the patient, diagrammatically marked by 2.

Said jaw vise is provided with a projection 3 with two perpendicular holes, wherein a supporting rod 4 may be inserted. Said rod 4 is fixed by means of a wing screw 5. The presence of the two perpendicular holes in the projection 3 allows the apparatus to be applied to any supporting element.

The upper extremity of the rod 4 is articulately connected, and may be fixed by means of the wing screw 5 to a tube 6 wherein may telescopically glide a rod 7. The position of the rod 7 inside the tube 6 and therefore its projection from the latter may be fixed by means of the pressure screw 8'.

At the extremity of the rod 7 is applied the ball socket designated in its entirety by 8, which allows the goniometric dial to be oriented.

Said socket, as is best illustrated by Fig. 4, comprises a sleeve 9 whereby the rod 7 ends. Sleeve 9, in its lower part is externally threaded at 10 and has a portion of reduced diameter whereon a helical spring 16 is mounted. On the thread 10 a cap 11 is screwed which contains in its inner part a sphere 12. In the inner cavity of the sleeve 9, a shank 14 is contained which terminates by a concave disc 15 which abuts against the sphere 12 under the influence of spring 16. The upper part of the inner bore of sleeve 9 is threaded to mesh with screw 13, which may be caused to press shank 14 to secure the sphere 12 in a desired position.

Rod 17 provided with a double curve projects downwardly and outwardly from the sphere 12. Rod 17 is fixed to shaft 26, which passes through the dial 18 rigidly connected thereto.

On the shaft 26 are rotatably mounted two indexes 19 and 20, disposed under the dial and having one end bent upon the edge of the dial. On the shaft 26 is also pivoted an L-shaped holder 30 the arm 21 of which, pivoted on the shaft 26, is parallel to the dial, while the arm 22 is perpendicular thereto. The arm 22 is hollow and allows the sliding thereinto of the arm 23 of a pointer 25, parallel to the dial, which arm 23 may be fixed by means of a pressure screw 24 at a predetermined distance with respect to the dial.

The pointer 25 is in the form of a plate curved downwardly and provided with a tip 31, which is located on the extension of the axis of the shaft 26. The forefinger of the operator who carries out the measurement bears against the curve of the pointer. When moving said forefinger inside the cavity of the human body, the pointer 25 moves and the L-shaped holder 30 therewith. Said holder is provided in its upper part with a pin 32 facing the lower surface of the dial intermediate the indexes 19 and 20, which are provided with a notch 33, wherein the pin 32 penetrates so as to permit indexes 19 and 20 to touch each other. When the L-shaped holder 30 moves with respect to the dial, pin 32 abuts one of the two indexes 19 and 20 and rotates it around the shaft 26 and generates on the dial an angle equal to the angle corresponding to the arc described by the tip of the touching finger of the operator inside the cavity of the human body.

The arrangement of the ball socket allows the goniometer to be oriented according to the inclination of the pelvis as results from the position of examination.

Also to this end the supporting arm of the director 25 is slidably embodied so that the distance according to the height of the pubic symphisis, between the plane of the goniometer and the plane, parallel to the former, of the guiding element, may be suitably arranged.

The lower part 23 of the vertical slider is provided with a threaded hole, wherein may be applied, perpendicular to the slider, a thin plate 27 provided with equidistantly-spaced holes; said plate may be fixed by means of the pressure screw 28. The inclination of the plate 27 corresponds to that of the pelvic plane and may be used for determining the direction of the central radius, in case of examination by X-ray.

The distance between the holes being of one centimeter, allows the direct reading of the deformed distance on the X-ray plate.

Figs. 5 and 6 show the arrangement of the sole apparatus and with the hand of the physician and indicate the disposition of the parts for obtaining the different desired measurements. Particularly after the apparatus has been placed in position, by means of the ball socket 8, the zero of the goniometer is brought in the sacrum subpubic direction, noting then the two angles comprised between the spinosubpubic lines on either side, which are fixed owing to the displacement of the director 25, by the alidades 19 and 20, gliding under the goniometer 18.

The length of said spino-pubic line on either the left or the right side is represented by the distance between the center of the subpubic cartilage and the tip of the lower ischiatic spine on either side. This distance can actually be measured with an ordinary ruler on that part of the examining physician's index finger that represents the prolonged tip of pointer 25 between the center of the subpubic cartilage and the tip of the ischial spine—after withdrawal of the hand from the pelvic cavity.

The arrangement of the different joints allows the length to be measured for any morphological conformation of the pelvis, in order to reach in any case the determination of the cephalopelvic index, while the arrangement of the plate 27 allows the direct manual exploration to be controlled by X-ray.

I claim:

1. An angle pelvimeter for measuring an angle located inside a cavity of a human body lying on a bed, comprising, in combination, a support adapted to be fixed to said bed, a supporting rod connected to the said support and movable with respect thereto in a plurality of planes, a graduated dial fixed to the said rod and movable therewith, an L-shaped holder having one arm parallel to said dial and pivoted upon said rod and having the other arm perpendicular to said dial, a pointer parallel to said dial and rotatable with respect thereto at a predetermined distance therefrom, said pointer being slidably connected to said other arm last mentioned of said L-shaped holder, said pointer being provided with a tip lying on the extension of the axis of said rod fixed to said dial, and means for rendering readable on the said graduated dial the angle whereby the pointer has rotated around said rod.

2. An angle pelvimeter for measuring an angle located inside the pelvic cavity of a woman, positioned for examination on a table comprising, in combination, a support adapted to be fixed to the bed, a supporting rod connected to said support and movable with respect thereto in a plurality of planes, a graduated dial fixed to said rod and movable therewith, said dial being bounded by two sides forming an obtuse angle and by an arc, said dial being fixed to the said rod at the center of curvature of the arc, an L-shaped holder having one arm parallel to said dial and pivoted to said rod and the other arm perpendicular to said dial, a pointer parallel to said dial and rotating with respect thereto at a determined distance therefrom, said pointer being slidably connected to the said arm last mentioned of the L-shaped support, said pointer being in the form of a plate curved downwardly and provided with a tip lying on the extension of the axis of the said rod passing through the center of curvature of the arc bounding the said dial, and means for rendering readable on the said graduated dial the angle whereby the pointer has rotated around said rod.

3. An angle pelvimeter for measuring an angle located inside the pelvic cavity of a woman, positioned for examination on a table comprising, in combination, a support adapted to be fixed to the bed, a supporting rod connected to said support which is movable with respect to said support in a plurality of planes, a graduated dial fixed to said rod and movable therewith, said dial being bounded by two sides forming an obtuse angle and by an arc, said rod being perpendicular to the said dial and being fixed thereto at the center of curvature of the said arc, the vertex of the said obtuse angle abutting against the outer surface of the human body adjacent the cavity during the measurement of the angle, an L-shaped holder having one arm parallel to said dial and another arm perpendicular thereto, said parallel arm being pivoted to said rod and movable with respect to said dial, a pointer parallel to the dial and slidably connected to the other arm last mentioned at a predetermined distance from said dial, said pointer rotating jointly with the said parallel arm around the said rod with respect to the said dial, said pointer being in the form of a plate curved downwardly and provided with a tip lying on the extension of the axis of the said rod passing through the center of curvature of the arc bounding the dial, said curved plate being arranged to receive in abutment the forefinger of the operator when the said finger penetrates into the cavity of the human body during the measurement, the tip of the pointer abutting against the outer surface of the body adjacent the said cavity, and means for rendering readable on the said graduated dial the angle whereby the pointer has rotated around said rod.

4. An angle pelvimeter for measuring an angle located inside the pelvic cavity of a woman, positioned for examination on a table comprising, in combination, a support adapted to be fixed to the said bed, a supporting rod connected to said support and movable with respect thereto in a plurality of planes, a graduated dial fixed to said rod and movable therewith, said graduated dial being bounded by two sides forming an obtuse angle and by an arc, said rod being perpendicular to the said dial and being fixed thereto at the center of curvature of the said arc, two indexes pivotally mounted on the said rod disposed under said dial and having one end bent upon the upper surface of the dial, an L-shaped holder having one arm parallel to the dial and the other arm perpendicular thereto, said parallel arm being pivoted to the said rod adjacent the said dial and movable with respect to the latter, a pointer parallel to the said dial and jointly rotating with the said parallel arm around said rod with respect to the said dial at a predetermined distance from the latter, said pointer being slidably connected to the said arm perpendicular to the dial, said L-shaped holder being provided with means rotating said indexes around said rod when said holder rotates around said rod, said pointer being in the form of a plate curved downwardly and provided with a tip lying on the extension of the axis of the rod passing through the center of curvature of the arc bounding the said dial.

5. An angle pelvimeter for measuring an angle located inside the pelvic cavity of a woman, positioned for examination on a table comprising, in combination, a support adapted to be fixed to the bed, a supporting rod connected to the said support and movable with respect thereto in a plurality of planes, a graduated dial fixed to said rod and movable therewith, said graduated dial being bounded by two sides forming an obtuse angle and by an arc, said rod being perpendicular to the said dial and being fixed thereto at the center of curvature of the said arm, two indexes pivotally mounted on the said rod disposed under the dial and having one end bent upon the upper surface of the dial, an L-shaped holder having one arm parallel to the dial and the other arm perpendicular thereto, said parallel arm being pivoted to the said rod adjacent the said dial and movable with respect to the latter, a pointer parallel to the said dial and jointly rotating with the said parallel arm around the said rod with respect to the said dial at a predetermined distance from the latter, said pointer being slidably connected to the said arm perpendicular to the dial, said L-shaped holder being provided with means adapted to rotate said indexes around the rod when said L-shaped holder rotates around the rod, said pointer being in the form of a plate curved downwardly provided with a tip located on the extension of the axis of the rod passing through the center of curvature of the arc bounding the said dial, and a graduated plate adjacent the pointer adapted to be fixed perpendicularly to said L-shaped holder and to the pointer.

References Cited in the file of this patent

UNITED STATES PATENTS

| 1,804,064 | Sison | May 5, 1931 |
| 2,095,059 | Donnelly | Oct. 5, 1937 |
| 2,507,959 | Chapman | May 16, 1950 |

FOREIGN PATENTS

| 20,672 | Great Britain | 1908 |

OTHER REFERENCES

Journal de Chirurgie, vol. 62, No. 5, 1946, page 215.